United States Patent Office 2,943,825
Patented July 5, 1960

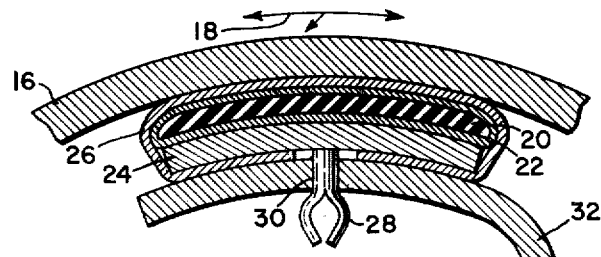
*Fig. 1*
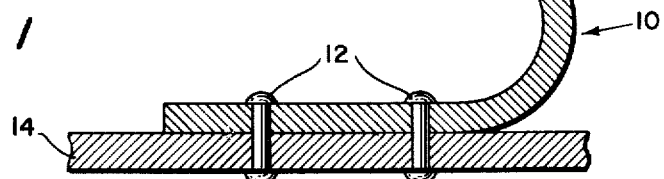
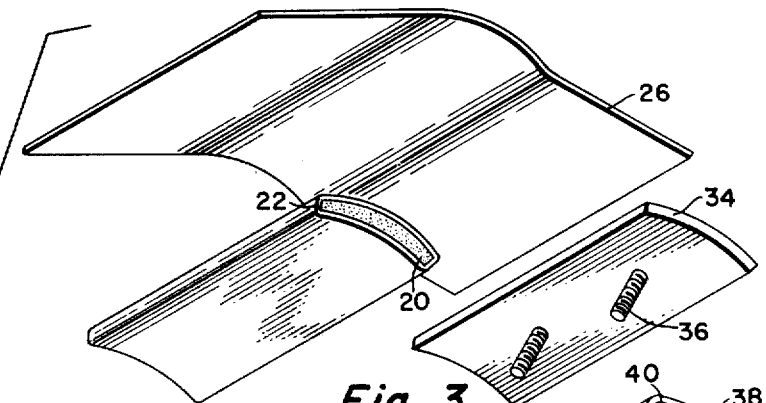
*Fig. 2*  *Fig. 3*
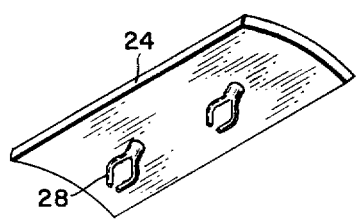
*Fig. 4*
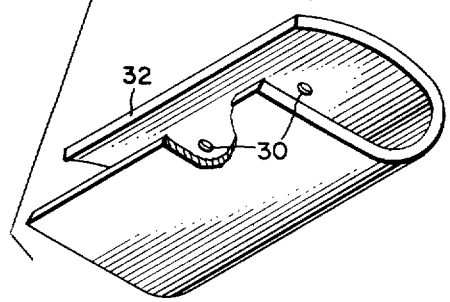
*Fig. 5*
INVENTOR.
FRANK L. LANE

2,943,825

AERODYNAMIC SEAL

Frank L. Lane, Dallas, Tex., assignor, by mesne assignments, to the United States of America as represented by the Secretary of the Navy Filed Jan. 22, 1958, Ser. No. 710,592

3 Claims. (Cl. 244—90)

This invention relates to seals, and more particularly to an aerodynamic seal assembly suitable for use in a wide range of temperature environmental conditions.

The space between airfoils of high speed aircraft requires the use of a seal to prevent the creation of air turbulence and for other operational reasons. A preferred seal must be tough to ensure both minimum wear and resistance to airfoil movement. In addition, such seals must be able to withstand low temperature conditions as well as high temperature conditions, such as a range of —40° F. to 300° F.

The seal assembly of this invention provides these desirable characteristics. The seal comprises a resilient pad encased in a fabric envelope. The pad is secured to a mounting plate by a thin, tough outer sheet material, preferably known as "Mylar," which is folded around the pad and the mounting plate. The fabric envelope preferably is secured to the pad at the time of curing of the molded silicone sponge rubber. The "Mylar" sheet is adhesively secured to the pad and mounting plate. The "Mylar" sheet is also mechanically clamped between the mounting plate and a spring bracket preferably by detachable fasteners because adhesives are unreliable at temperatures below —40° F.

A principal object of this invention is to provide an aerodynamic seal for airfoils capable of withstanding both low and high temperatures; fuel, oil, and tear resistant; and which offers a minium of resistance to a contacting moving part and provides longer wear.

Another object is to provide a seal having components which are both adhesively and mechanically clamped together.

Other objects and many of the attendant advantages of this invention will be readily appreciated as the same becomes better understood by reference to the following detailed description when considered in connection with the accompanying drawings wherein:

Fig. 1 is an enlarged cross section of a seal assembly mounted adjacent a movable foil;

Fig. 2 is an exploded perspective view of the seal assembly; and

Figs. 3, 4, and 5 illustrate modifications of the mounting plate and detachable fasteners.

Referring to the drawing where like numerals refer to similar parts throughout the views, there is shown in Fig. 1 an aerodynamic seal assembly 10 adapted to be secured by rivets 12 to an airfoil 14, and slidably to engage another laterally spaced airfoil 16. Airfoil 16 is capable of being moved in the directions indicated by arrows 18 which represent compression, tension and shear forces in the sealing system.

As shown in Figs. 1 and 2, the seal comprises an intermediate layer or resilient pad 20, preferably of silicone sponge rubber, enclosed in a sheet of "Dacron" woven cloth 22 adhered to the silicone simply by having the silicone extruded through the fabric weave during the final curing of the silicone rubber pad. Silicone is the preferred material due to its particularly high and low temperature resistance and because it can be sponged and molded to the desired durometer hardness. The cloth covered pad is clamped to the upper side of a concavo-convex curved mounting plate 24 by an outer film of tough flexible material 26 the ends of which are folded around pad 20 and tucked underneath the mounting plate and bonded to the respective parts by an adhesive. An example of a suitable adhesive is a Buna-N type adhesive manufactured by the E. I. du Pont de Nemours and Company (Inc.) under Catalogue No. E.C. 826. Sheet 26 provides a tough protective cover permitting slippage, as well as fuel and oil resistance. One material offering these characteristics is known as "Mylar" manufactured by the E. I. du Pont de Nemours and Company (Inc.) and having a thickness of .0015". The temperature range of operation may be extended from —65° F. to 400° F. if sheet 26 is made of "Teflon." A suitable adhesive therefor is C-313 manufactured by the B. B. Chemical Company, Cambridge, Massachusetts.

Mounting plate 24 preferably is provided with detachable fastening means, such as resilient prongs 28 integrally secured to the underside of the plate and adapted to be snap-fitted into drilled openings 30 in a seal bracket 32. Bracket 32 is U-shaped and fabricated out of spring steel, one leg being secured to airfoil 14 as previously described, the other leg being concavo-convex and forming a resilient support for the seal. Fastening means 20 also functions to mechanically clamp both tucked ends of sheet 26 between plate 24 and the bracket. This clamping action is obtained by forming the curved mounting plate 24 with a radius of curvature less than that of the bracket leg to which it is attached (not illustrated). Mechanically clamping "Mylar" sheet 26 to supplement the adhesive securing means is desirable because adhesives are not reliable at temperatures below —40° F. frequently encountered in aircraft flight.

Although a snap-fitting securing means such as prongs 28 to secure mounting plate 24 and attached seal to the bracket is preferred due to the inaccessibility to the underside of seal bracket 32 in some installations, other types can be employed. For example, in Fig. 3 mounting plate 34 is provided with integrally mounted threaded studs 36 adapted to project through openings 30 in the seal bracket and secured therein by nuts, not shown. In Fig. 4, a mounting plate 38 is formed with lateral channels 40 for anchoring sliders 42 on which is mounted snap fasteners 44 similar to 28 in Fig. 1. The modification of Fig. 5 employs a mounting plating 46 similar to 38 of Fig. 4, except that sliders 48 have threaded openings 50 to receive screws 52. The angle between the legs of the bracket 32 may be opened slightly to facilitate access to screws 52 by a suitable tool.

The seal and seal bracket of this invention provide a simple and versatile low temperature aerodynamic seal that can be readily replaced. The seal is resistant to fuels and oils and to low temperatures.

Obviously many modifications and variations of the present invention are possible in the light of the above teachings. It is therefore to be understood that within the scope of the appended claims the invention may be practiced otherwise than as specifically described.

I claim:

1. An aerodynamic seal for an opening between relative slidable airfoils comprising a bracket having one leg adapted to be secured to one of said airfoils, another leg of said bracket providing a resilient support for a seal assembly, said assembly including a mounting plate, a pad of resilient material bonded within a fabric envelope positioned adjacent one side of said mounting plate, an outer covering of a thin, tough, flexible sheet of plastic material extended around said enclosed pad and terminating on the other side of said mounting plate, and mechanical means for mechanically securing said mounting plate to said supporting leg.

2. The seal of claim 1 wherein said mounting plate and said supporting plate are both concavo-convex in cross section, the radius of the mounting plate being less than the radius of the leg to provide a clamping action on the sheet material disposed therebetween.

3. An aerodynamic seal for the opening between airfoils comprising a U-shaped spring bracket having one leg adapted to be secured to an airfoil and another concavo-convex curved leg extending freely to provide a support for a seal assembly, said assembly including a concavo-convex curved mounting plate, a silicon sponge rubber pad enclosed in a nylon woven fabric envelope and being secured therein by extrusion of the silicone in the fabric weave during the curing of the foam rubber pad, and positioned adjacent one side of the mounting plate, an outer covering of a thin plastic sheet material folded around and adhesively attached to said enclosed pad and said mounting plate securing the pad to one side of said mounting plate, said other side of the mounting plate having projecting snap fasteners adapted to engage counterpart fasteners in said free arm of the bracket, the radius of the mounting plate being less than the radius of the free leg to provide a clamping action on the sheet material disposed therebetween.

References Cited in the file of this patent
UNITED STATES PATENTS

| | | |
|---|---|---|
| 1,947,130 | Johnson | Feb. 13, 1934 |
| 1,989,276 | Howard | Jan. 29, 1935 |
| 2,239,269 | Lundrall | Apr. 22, 1941 |
| 2,444,293 | Holt | June 29, 1948 |
| 2,484,359 | Lipton | Oct. 11, 1949 |
| 2,695,191 | Naughton | Nov. 23, 1954 |

FOREIGN PATENTS

| | | |
|---|---|---|
| 333,478 | Great Britain | Aug. 14, 1930 |